US006085210A

United States Patent [19]
Buer

[11] Patent Number: 6,085,210
[45] Date of Patent: Jul. 4, 2000

[54] HIGH-SPEED MODULAR EXPONENTIATOR AND MULTIPLIER

[75] Inventor: Mark Leonard Buer, Chandler, Ariz.

[73] Assignee: Philips Semiconductor, Inc., Sunnyvale, Calif.

[21] Appl. No.: 09/010,897

[22] Filed: Jan. 22, 1998

[51] Int. Cl.[7] .................................................... G06F 7/72
[52] U.S. Cl. .......................................................... 708/491
[58] Field of Search ............................................. 708/491

[56] References Cited

U.S. PATENT DOCUMENTS

| | | | |
|---|---|---|---|
| 5,289,397 | 2/1994 | Clark et al. ............................ | 708/491 |
| 5,479,365 | 12/1995 | Ogura ..................................... | 708/491 |
| 5,513,133 | 4/1996 | Cressel et al. ........................ | 708/491 |
| 5,742,530 | 4/1998 | Gressel et al. ........................ | 708/491 |
| 5,867,412 | 2/1999 | Suh ........................................ | 708/491 |
| 5,912,904 | 6/1999 | Monier ................................... | 708/491 |
| 5,928,315 | 7/1999 | Kobayashi et al. ................... | 708/491 |

OTHER PUBLICATIONS

Burnett, S., "The Mathematics of RSA," An RSA Data Security, Inc. Engineering Brief, http://dslab.csie.ncu.edu.tw/~lucas/rsamath.HTM, pp. 1–5 (Jun. 10, 1997).

Burnett, S., "The Mathematics of RSA," An RSA Data Security, Inc. Engineering Brief, file:///H/HOME/RGREGS/RSAMATH.HTM, pp. 1–11 (Sep. 10, 1997).

Untitled document, author unknown, Reproduced from *Electronic Engineering Times* with permission, 2 pgs. (undated).

Eldridge, S. et al., "Hardware Implementation of Montgomery's Modular Multiplication Algorithm," *IEEE Transactions on Computers*, 42(6):693–699 (Jun., 1993).

Montgomery, P., "Modular Multiplication Without Trial Division," *Mathematics of Computation*, 44(170):519–521 (Apr., 1985).

Walter, C., "Systolic Modular Multiplication," *IEEE Transactions on Computers*, 42(3):376–378 (Mar., 1993).

Petro, J. et al., "An Improved Modular Multiplication Algorithm and Hardware Implementation," 7 pgs. (May, 1991).

*Primary Examiner*—David H. Malzahn

[57] ABSTRACT

High-speed multiplication and exponentiation are performed by performing a modulus multiplication operation on received operands. A memory stores the operands and intermediate mathematical operation results of the modulus multiplication operation. A software-controllable, hardware state machine controls performance of the modulus multiplication operation according to a Montgomery multiplication algorithm.

25 Claims, 3 Drawing Sheets

BLOCK DIAGRAM OF IMPLEMENTATION USING 32 X 32 CORE

Fig. 3

HIGH-SPEED MODULAR EXPONENTIATOR AND MULTIPLIER

FIELD OF THE INVENTION

The present invention relates to computing modular exponentiation and multiplication using a peripheral device coupled to a processor wherein the computational tasks for the processor are significantly decreased via the architecture of the peripheral device.

BACKGROUND OF THE INVENTION

For some time, systems have been performing relatively complex computations using general-purpose computers. Largely due to the complexity of the processing to be performed in various types of applications, such implementations have been replaced by faster, more dedicated computer and/or discrete logic designs to address the near-real time system demands. Ongoing demands for increasingly complex computations and the advent of certain technologies, such as public key cryptography, have spurred efforts to design and build special purpose computational hardware capable of rapidly performing complex computations, such as modular multiplication and exponentiation of extremely large numbers.

Related efforts to discover and exploit several important mathematical enhancements to the process utilized in performing modular multiplication have also been addressed. More recently, with the development of Application Specific Integrated Circuits (ASICs), designers can now realized single-IC solutions for complex computational problems. Through such development, there have been attempts to implement a computational device which performs modular multiplication. One such procedure is disclosed in an article entitled, "Modular Multiplication Without Trial Division," by P. L. Montgomery and published in *Mathematics of Computation*, Vol. 40, No. 170, pp. 519–521, April 1985, incorporated herein by reference. Some other approaches use dedicated hardware techniques involving architectures known as systolic arrays to perform modular multiplication. An example approach of this type is discussed in detail in an article entitled, "Systolic Modular Multiplication," by C. D. Walter, *IEEE Transactions on Computers*, Vol., 42, No. 3, March 1993, pp. 376–378; and in, "Hardware Implementation of Montgomery's Modular Multiplication Algorithm," by S. E. Eldridge & C. D. Walter, *IEEE Transactions on Computers*, Vol. 42, No. 6, June 1993, pp. 693–699. Such systolic array architectures have been successful in reducing the processing time for the modular computations sufficiently to overcome the limitations of software-based processing solutions.

Encryption systems often use operands and modulus values consisting of 1024 bits or more. For this and other reasons, systolic array architectures involve a significant number of hardware elements to construct dedicated, special purpose modular multiplication processors. As the length of the operands to the modular multiplication and the length of the modulus increases, more logic gates are involved in implementing the processing apparatus.

SUMMARY OF THE INVENTION

According to one embodiment of the present invention, a high-speed modular exponentiator for calculating an exponentiation includes a modulus multiplier configured and arranged to generate a product in response to given multiplicands. A memory is configured to store operands corresponding to modulo representations of the multiplicands. A first state machine is coupled to the modulus multiplier, to receive the operands from the memory, and to control a sequence of mathematical operations. These mathematical operations are used by the modulus multiplier to perform a modulus multiplication operation. A second state machine controls a sequence of modulus multiplication operations for calculating the exponentiation.

Another embodiment of the present invention is directed to an apparatus for performing a high-speed exponentiation operation. A multiplier core is configured and arranged to receive operands and perform a modulus multiplication operation. A memory is coupled to the multiplier core and is configured to store the operands and intermediate mathematical operation results of the modulus multiplication operation. A first hardware state machine controls a sequence of operations used by the multiplier core in generating the intermediate mathematical operation results. A second hardware state machine controls a sequence of the modulus multiplication operations used to perform the exponentiation operation.

In still another embodiment of the present invention, an apparatus for performing high-speed multiplication and exponentiation operations includes a multiplier core configured and arranged to receive operands and perform a modulus multiplication operation. A memory coupled to the multiplier core independently stores the operands and intermediate mathematical operation results of the modulus multiplication operation. A software-controllable, hardware state machine is configured and arranged to control the multiplier core to perform a Montgomery multiplication operation. According to yet another embodiment of the present invention, the apparatus forms part of an encryption apparatus.

In another embodiment of the present invention, high-speed multiplication and exponentiation are performed by performing a modulus multiplication operation on received operands. The operands and intermediate mathematical operation results of the modulus multiplication operation are stored in a memory. A software-controllable, hardware state machine is used to control performance of the modulus multiplication operation according to a Montgomery multiplication algorithm.

BRIEF DESCRIPTION OF THE DRAWINGS

The invention may be more fully understood in consideration of the detailed description of various embodiments of the invention that follow in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DISCLOSED EMBODIMENTS

The present invention is believed to be applicable to a variety of systems and arrangements that require both multiplication and exponentiation of two operands using modular mathematics, e.g., as may be used in connection with public or private key cryptography. The invention has been found to be particularly advantageous in application environments in which the calculations of $A*B$ mod N and $A^B$ mod N are performed. An appreciation of various aspects of the invention is best gained through discussion of application examples operating in such an environment. Before addressing the specifics of such examples, presented below is a brief discussion of modular mathematics, of the Montgomery multiply algorithm, and of a modular exponentiation algorithm.

Modular Mathematics

The present invention utilizes modular mathematics, i.e., modular multiplication and exponentiation, when performing any operations. Modular mathematics means that the only numbers under consideration are non-negative integers less than the modulus, n. So, for mod n, only the integers from 0 to (n−1) are valid operands and the results of operations will always be non-negative integers between 0 and (n−1), inclusive.

A simple example of modulus mathematics is the addition of hours using military time, wherein the modulus of the addition is 2400. For example, the addition of 4 hours to 10:00 pm is (2200+400) mod 2400=(2600) mod 2400=200 or 2:00 am Modular multiplication is performed similarly to addition as discussed above. For the generic operation of $A*B$ mod n, the result is the remainder of the product of $A*B$ when divided by the modulus n. For example, (6*500) mod 2400=(3000) mod 2400=600, the remainder of the division of 3000/2400

Modular exponentiation, $y=A^B$ mod n, is equivalent to

[[(A*A) mod n]*A mod n] . . .

performed B times or, once again, the remainder of $A^B$ when divided by the modulus n.

Consider the following example: $49^{27}$ mod 55. Rather than compute it directly, consider that $49^{27}=49^{16+8+2+1}=49^{16}*49^8*49^2*49^1$.

$49^0$=1 mod 55

$49^1$=49 mod 55

$49^2$=($49^{1+1}$) mod 55 ($49^1*49^1$) mod 55=2401 mod 55=2401−(43*55)=36 mod 55

$49^4$=$49^{2+2}$=$49^2*49^2$=(36*36) mod 55=1296−(23*55)=31 mod 55

$49^8$=$49^{4+4}$=$49^4*49^4$=(31*31) mod 55=961−(17*55)=26 mod 55

$49^{16}$=$49^{8+8}$=$49^8*49^8$=(26*26) mod 55=676−(12*55)=16 mod 55

Now substituting:

$49^{27}$ mod 55=($49^{16}*49^8*49^2*49^1$) mod 55

($49^2*49^1$) mod 55=(36*49) mod 55=1764−(32*55)=4 mod 55

[$49^8*(49^2*49^1)$] mod 55=(26*4) mod 55=104−55=49 mod 55

{$49^{16}*[49^8*(49^2*49^1)]$} mod 55=(49*16) mod 55=764−(114*55)=14 mod 55

The above principles for exponentiation apply for any values of A, B, and n where $y=A^B$ mod n.

Another aspect of modular mathematics, which is the basis for RSA or public key cryptography, is the concept of a modular inverse. Two numbers are modular inverses of each other if the remainder obtained by dividing their product by the modulus n is 1. For example, for the modulus 2400, 7 and 343 are modular inverses of each other because (7*343) mod 2400=2401 mod 2400 or 1 mod 2400. The concept of the modular inverse is utilized in RSA cryptography in that if A and B are modular inverses of each other, then

[(X*A) mod n*B mod n]=X*[A*B mod n] mod n=X*1 mod n=X for X<n

Therefore, if X is the input message and A and B are the cryptography keys, (X*A mod n) is the encrypted message which then can be decrypted by multiplying the encrypted message by B mod n. The selection of A and B for a given modulus n, which is the basis for RSA cryptography, is beyond the scope of this invention. This invention allows the rapid encryption and decryption of messages by performing the multiplication of the messages X by A and B respectively mod n once the values of A, B, and n are known.

Montgomery Multiply of $A*B$ mod N

To perform modular multiplication of two numbers A and B using the Montgomery algorithm as implemented using a 64 bit-by-64 bit multiplier, a 64-bit value K representing the negative of $N_0^{-1}$ mod $2^k$ is precomputed. $N_0$ represents the least significant 64-bit word of the modulus N. Because the process involves a 64 bit-by-64 bit multiplier, k in this case is 64. In a particular embodiment of the present invention, A, B, and N consist of sixteen 64-bit words. The values of B and N are loaded into registers X and Y, which are also sixteen 64-bit words long. A group of registers $C_x$ store the result of the modular multiplication operation and is initialized at zero. According to a particular embodiment of the present invention, the C registers store thirty-four 32-bit words.

Processing then flows to an iterated loop, which is run once for each of the sixteen words forming A. Each iteration of the loop corresponds to a word of the A register. During this loop, a carry word is initialized to zero by clearing an accumulator. Next, the respective word $A_j$ of A is loaded into the least significant word Y[0] of the Y register.

During each iteration of the loop, a second iterated loop is executed. The second iterated loop is executed sixteen times during each iteration of the first loop, once for each word in the multiplicands A and B. Within the second loop, a word $C_i$ of the C registers is calculated by multiplying the instant word of A by the ith word of B, where i represents the current iteration of the second loop, and adding the carry word and the current value of $C_i$. The multiplication is performed by multiplying the least significant word Y[0] of the Y register, which stores the instant word of A, by the ith word of the X register, which stores the ith word of B. The carry word is then calculated as the high bits of $C_i$, i.e., $C_i$ right-shifted k times.

Next, the low bits are obtained by performing a bitwise AND operation on $C_i$ and $(2^k-1)$. To perform this operation, $C_i$ is loaded into the registers. The sixty-four lowest bits of the accumulator, designated as low words 0 and 1, are stored in a temporary variable. Next, the accumulator and overflow are shifted sixty-four bits to the right, and the contents of the temporary variable are added to $C_i$. If a carry results from this addition operation, the accumulator is incremented. Processing then returns to the beginning of the second loop, which is executed sixteen times during each iteration of the first loop.

After the second loop has been executed, the most significant word of the C registers is added to the carry word to generate a new value for the most significant word. To do this, the most significant word of the C registers is loaded into the registers. The temporary variable is then loaded with low words 0 and 1 of the accumulator. This value is then added to the most significant word of the C registers to generate a new value for the most significant word.

Next, the least significant word $C_0$ of the C registers and the precalculated value of K are multiplied, and the product is stored in the temporary variable. This multiplication is performed by loading $C_0$ and K into the least significant words X[0] and Y[0] of the X and Y registers, respectively, and multiplying X[0] by Y[0]. A bitwise AND operation is then performed on the temporary variable and $(2^k-1)$ by loading the temporary variable with low words 0 and 1 of the accumulator and clearing the accumulator.

Next, the carry word is calculated as the sum of $C_0$ and the product of the temporary variable and $N_0$. The temporary variable is loaded into the least significant word X[0] of the X register, and $N_0$ is loaded into the registers and into the least significant word Y[0] of the Y register. X[0] and Y[0] are then multiplied, and $C_0$ is loaded into the registers. The temporary variable is then added to $C_0$, and the sum is stored in the temporary variable. The accumulator and overflow are then shifted 64 bits to the right. If a carry occurred while adding the temporary variable and $C_0$, the accumulator is incremented.

Processing then flows to a third iterative loop. In this third loop, each of the C registers $C_{i-1}$ is updated by multiplying the word $N_i$ of N that corresponds to the next least significant position of the C registers and the temporary variable and adding the contents of the next least significant C register $C_i$ and the carry word. To perform this calculation, the product of the least significant word X[0] of the X register and the ith word Y[i] of the Y register are multiplied, and $C_i$ is loaded into the registers. The temporary variable is then loaded with low words 0 and 1 of the accumulator, which is then shifted, along with the overflow, 64 bits to the right. The low bits are then obtained by performing a bitwise AND operation on $C_i$ and $(2^k-1)$. To perform this operation, $C_{i-1}$ is calculated as the sum of $C_i$ and the temporary variable and is stored. If a carry occurred during this addition operation, the accumulator is incremented. Processing then returns to the beginning of the third loop, which is executed sixteen times according to a particular embodiment of the present invention.

After the third loop has finished executing, the (i-1)th word of the C registers $C_{i-1}$ is calculated as the sum of the ith word $C_i$ and the carry word. To do this, $C_i$ is loaded into the registers, and the temporary variable is loaded with low words 0 and 1 of the accumulator. After the sum is calculated, $C_i$ is updated to store the value of $C_{i-1}$, shifted 64 bits to the right. To perform this operation, $C_{i-1}$ is calculated as the sum of $C_i$ and the temporary variable and is stored. If a carry occurred during this addition operation, the accumulator is incremented. Next, $C_{i-1}$ is updated to store the result of a bitwise AND operation performed on its current value and $(2^k-1)$. Processing then returns to the beginning of the first iterated loop.

After the first iterated loop has completed execution, the modular product T is computed as C-N because C is potentially larger than the modulus N. If C is larger than N, the modular product is C-N. According to a particular embodiment of the present invention, the subtraction operation is performed using multiprecision subtraction.

In the immediately following discussion, the calculation being performed by an embodiment of the present invention is: A*B mod n, where A, B, and n are 32-word numbers. The present invention is, of course, applicable to other word sizes and other calculations.

Figure 1:
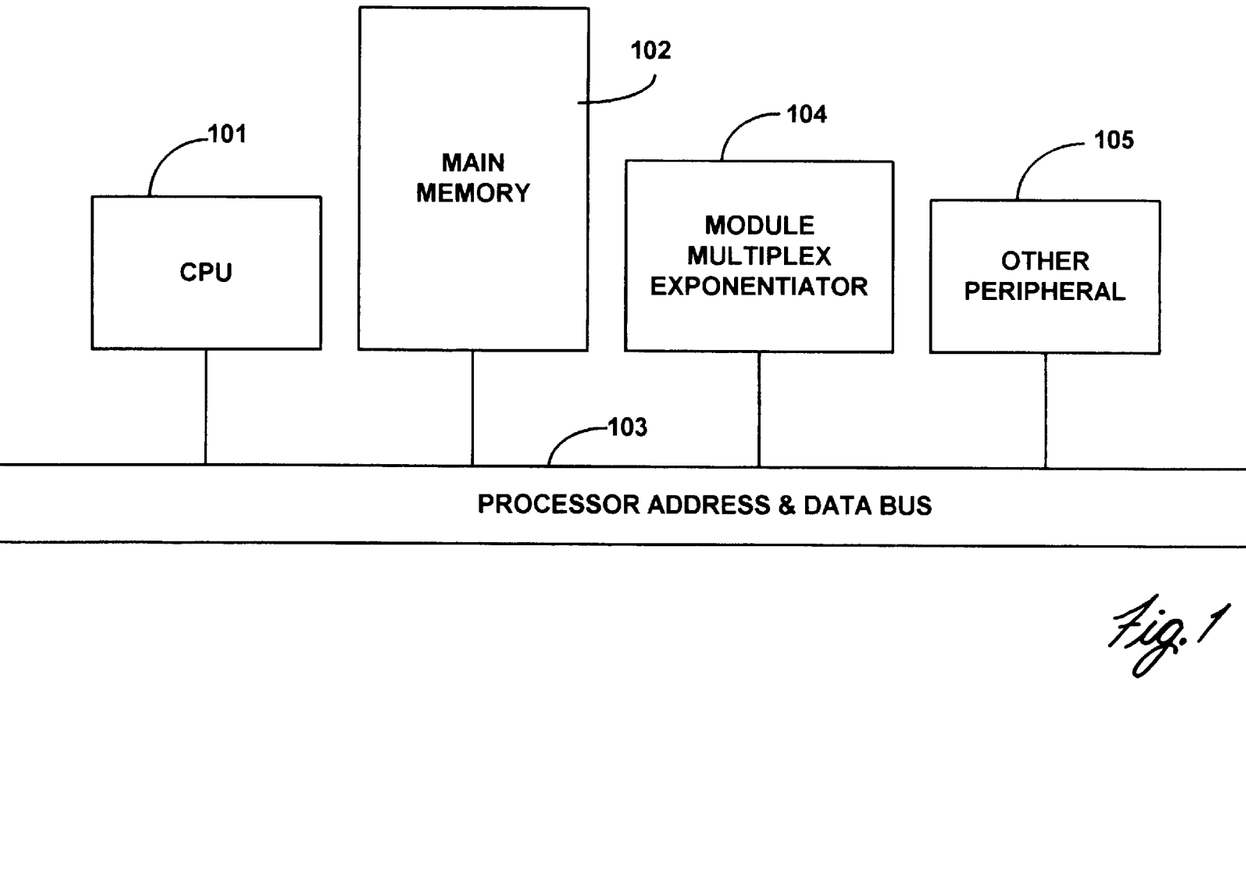
FIG. 1 is a block diagram illustrating an example arrangement, according to an embodiment of the present invention, in which the multiplier/exponentiator is a peripheral device attached to the processor bus of a CPU.

FIG. 1 illustrates an example modulo multiplier and exponentiator 104, according to an embodiment of the present invention, that can be viewed as a peripheral device located on a processor bus 103 that connects the multiplier/exponentiator to a CPU 101 and to a main memory 102. The CPU 101 communicates with the multiplier/exponentiator 104 over the bus 103 to provide operands to be multiplied and receive the result. In one particular embodiment of the present invention, the multiplier/exponentiator 104 can access the main memory 102 to obtain operands and to provide return results over the processor bus 103.

Figure 2:
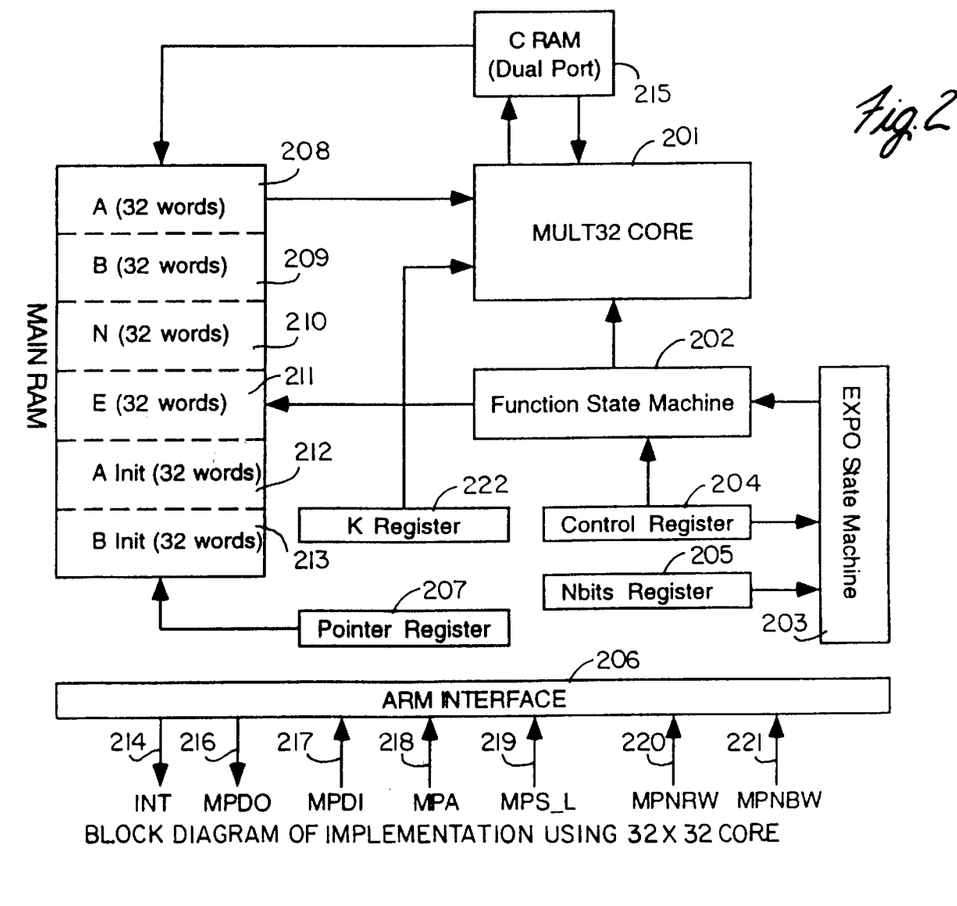
FIG. 2 is a block diagram illustrating an example multiplier/exponentiator, according to an embodiment of the present invention.

FIG. 2 is a block diagram of a particular embodiment of the modulo multiplier/exponentiator. The multiplier/exponentiator is based upon a MULT32 core 302 that interfaces with a main memory to get its operands with a K register 222 to obtain a precomputed constant used in the calculations, a dual-ported C RAM 215 which provides scratch memory locations for use during processing, and a function state machine 202, which controls the operation of the core 302. A memory stores four operands that are used during processing. These operands are 32 words long and include A 208, B 209, N 210, and E 211.

The memory also stores two additional operands, A INIT 212 and B INIT 213, which represent initial values for the A and B operands. These are duplicate copies of the initial states of operands A and B that facilitate faster operation should the initial A and B operands be needed more than once. These operands can be located in either on-chip or off-chip memory. These operands are addressed using a pointer register 207 with the operands mapped into the memory space of the main processor. There is no functional difference between the operation of the present invention when these operands are stored either on- or off-chip. Performance characteristics can, however, vary should these operands need to be accessed over the processor's main bus from a memory.

An interface 206 carries a set of signals to the processor and through its bus. The signals include two output signals INT 214 and MPDO 216. The INT signal serves as an interrupt indicating that an operation has been completed. The MPDO signal refers to the output of the interface 206 and is read by the microprocessor.

The interface 206 also carries five input signals, including MPDI 217, MPA 218, MPS_L 219, MPNRW 220 and MPNBW 221. The MPDI signal is the input data used by this block to update register information. The MPA signal is the address used to select particular locations within a register. The MPS_L signal is a block select that provides a predecode on the address line. The MPNRW signal is the read/write signal for the operation. The MPNBW signal designates whether the operation access a byte or a word of memory.

The operation of the multiplier/exponentiator is controlled through the operation of two state machines. The function state machine 202 controls the operation of the sequencing steps needed to perform lower level instructions, such as adding, subtracting, and multiplying operands. The function state machine 202 is also used to control operations involved in moving operands from main memory to various locations and storing them. A higher level state machine, labeled as an exponentiation state machine 203, controls the sequencing of a series of lower level instructions to perform the exponentiation function, according to an embodiment of the present invention. These state machines are also controlled by two control registers 204 and an N bits register 205, the bits of which are discussed elsewhere.

Functionally, the multiplier/exponentiator performs modular multiplication of A*B mod n. Alternatively, the present invention performs the exponentiation operation of $A^B$ mod n, where B is $2^{2n}$ mod N. The multiplication and exponentiation are performed using, for example, the Montgomery multiplication algorithm discussed above.

Figure 3:
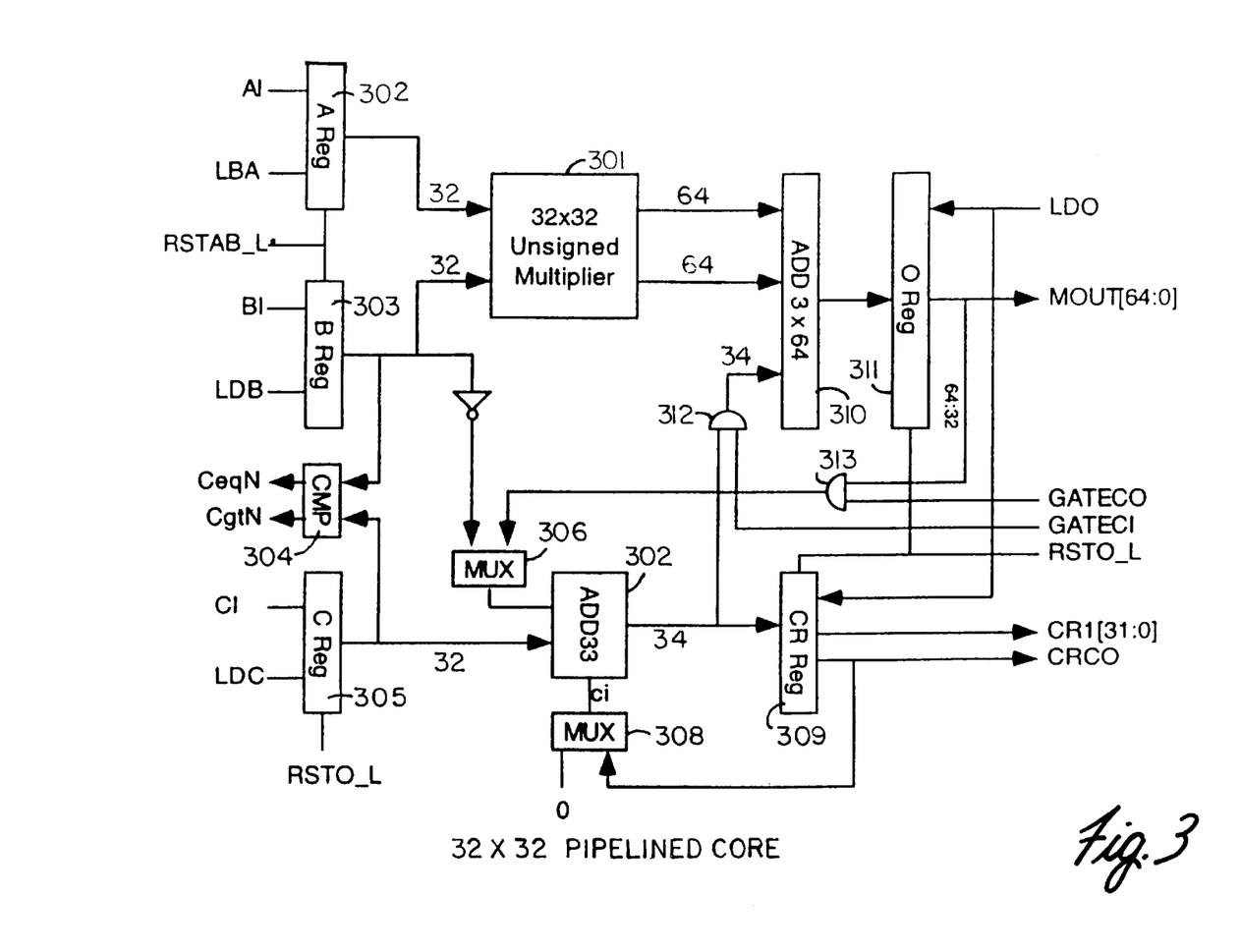
FIG. 3 is a block diagram illustrating an example pipelined multiplier forming part of the modular multiplier/exponentiator, according to an embodiment of the present invention.

FIG. 3 is a block diagram illustrating a particular embodiment of the multiplier core, according to an embodiment of the present invention. This multiplier is a 32 bit-by-32 bit pipelined core based around a 32 bit-by-32 bit unsigned multiplier 301. This multiplier receives its operands from an A register 302 and a B register 303. The output of the multiplier 301 is sent to a 3-by-64 bit adder 310 to produce the output of, essentially, A*B+C. The adder 310 also receives as input the output of a 33-bit adder 307, which in turn receives input from a C register 305.

The other inputs to the adder 307 come from a multiplexer 306 and a multiplexer 308. The multiplexer 306 selects between the inverted output of the B register and the output of an O register 301 gated within a gate 313. Inverting the output of the B register enables the adder 307 to perform the subtraction operation of C−B in ones' complement notation. The output from the 3-by-64 bit adder 310 is sent to the O register 311. A CR register 309 receives an intermediate value of the product A*B+C for future use. This value is also stored in the dual-ported C RAM of the multiplier/exponentiator.

The C register, which is a 32-bit register within the pipelined core, stores a subset of the 32 working entries corresponding to the product being calculated. Since the A and B operands consist of 32 words, these are multiplied together again to produce a 32 word output. The processing is performed as a sequence of operations on one 32-bit word at a time. The process is performed in a pipelined fashion such that the A and B registers are being loaded as the calculation from the prior clock cycle is being performed in the multiplier. While this operation is performed, the output C is loaded back out into the dual-port memory. The processing is performed through a series of iterations as all of the calculations through all 32 words are performed.

One implementation for processing according to the multiply operation of 32 bit words, according to the present invention, is illustrated in the attached Appendix A, which is a program written in the C programming language. Using this program, corresponding hardware logic can be developed using conventional hardware descriptive language (HDL) techniques.

One implementation for processing to perform the calculating of the exponentiation function for the 32-bit words, according to the present invention, is illustrated in the attached Appendix B, which is another program written in the C programming language. Using this program, the hardware logic can be developed using conventional HDL techniques.

Multiplier/Exponentiator Programming Interface

According to a particular embodiment of the present invention, a multiplier/exponentiator is implemented as a peripheral device located on the processor bus of the main CPU. The CPU loads the operands that are to be used in the modular multiplication or exponentiation and instructs the device to begin calculations. With the device performing the calculations, the CPU is free to perform other tasks. When the calculation has been finished, the device informs the CPU using, for example, a polling or interrupt technique.

In order to control the operation of the multiplier/exponentiator, a set of control registers and interface signals are set or read, depending on the application. These signals or control bits interact with the various parts of the multiplier discussed above.

An ASIC implementation may be realized using definitions for a hardware descriptive language of the type VHDL or Verilog.

In an example implementation, the following definitions of registers can be used to provide adequate modularity and flexibility for specific bit control.

Mult__K Register (R/W) (Reset=0000 0000h) 620XX000h

Montgomery K value (32 bits) is stored in this register. The value is the precomputed value of N[0]−1 where N[0] is the lowest word of the modulus. The value K is computed by the ARM processor and loaded into this register every time the modulus changes. The value of N[0] must be odd (bit zero is 1) for the Montgomery algorithm to work (relatively prime to 2).

Mult__C Register/Mult-CR Register (R/W) (Reset=0000 0000h) 620XX00Ch

The Mult__C register (32-bit) contains the Add In value of the C[i] that is fetched from the CRAM. This register is write only. A read of this register gives the value contained in the Mult__CR output register. The Mult__CR output register is the same as the Mult__C register when the multiplier is in multiply 32×32 state.

Mult__A Register/Lower Accumulator (R/W) (Reset=0000 0000h) 620XX004h

The Mult__A register (32-bits) is writable by the processor so that a 32×32 multiplication can be performed. When this address is read, the lower 32 bits of the accumulator are returned.

Mult__B Register/Upper Accumulator (R/W) Reset=0000 0000h

The Mult__B register (32-bits) is writable by the processor so that a 32×32 multiplication can be performed. When this address is read, the upper 32 bits of the accumulator are returned.

Multiplier Control and Status (Mult-CtISts) Register (R/W) Reset=0000h

The Mult__CtISts register provides the interface to the ARM for command access. The ARM has access to each of the individual functions that the hardware uses to do the exponentiation.

TABLE A

| Mult-CtiSts Register (R/W) (Reset = 0000h) 620XXX010h | | | | | | | |
|---|---|---|---|---|---|---|---|
| 15 | 14 | 13 | 12 | 11 | 10 | 9 | 8 |
| Wbsel[1] | Wbsel[0] | Czero | BigMult | Reserved | Aone | Softrst | Overflow |
| 7 | 6 | 5 | 4 | 3 | 2 | 1 | 0 |
| Done | Exponent | CeqN | CgtN | WriteB | Subtract | Compare | MontJ |

Bit[3:0] Function Control

These bits determine the function or combination of functions that is executed by the hardware state machine. The low order functions are always executed first.

TABLE B

| Mult/Expo Function Control | |
|---|---|
| Bits[3:0] | Function |
| 0000 | Multiply 32 × 32 (A register * B register) = 64 bit result |
| 0001 | Montgomery J Loop |
| 0010 | Compare C to N |
| 0100 | Subtract N from C (C = C − N) |
| 1000 | Write back C to wbsel location |

The bits in this register are active during the exponentiation even if the functions are used by the exponentiator state machine.

Bit[0] MontJ—Montgomery J Loop

Execute the Montgomery Algorithm J Loop one time using A, B and N as defined by the pointer register.

Bit[1] Compare—Compare C to N

Compare C result value (33 words) to the modulus N the result is reported back to the Mult_CtISts register by the CgtN and CeqN status bits in the Mult_CtISts register. If the subtraction bit is set and the C value is greater than N, then the subtraction function is automatically executed when the compare is complete. If the C value is less than N, the subtraction is not done even if the subtraction bit is set.

Bit[2] Subtract—Subtract N from C (C=C−N)

This function subtracts the modulus from C and stores the result of the subtraction back in C. This function is only executed if the value of C is greater than or equal to N.

Bit[3] WriteB—Write Back Result

When this bit is set, the C result value is written back to the input memory in the Wbsel location. The result is only written back as 32 words, and the carry word (33) should be a zero after the subtraction or else the next Montgomery value is corrupted.

Bit[4] CgtN—C result is greater than N

This bit is set to a one when the compare completes if C is greater than N. Since C is 33 words, then if the 33 word is 1 (can only be a 0 or 1 when the Montgomery loop is finished) this bit is set and the compare is finished.

Bit[5] CeqN—C equals N equals zero

This bit is set to a one when the compare completes if C equals N. This is a special case in modulus math where the result is actually zero because the result is equal to the modulus. However, the result is left in its modulus state and the subtraction is not performed (e.g. 3 mod 3=0 is left as 3).

Bit[6] Exponent—Exponentiate

Writing a one to this bit begins exponentiation. The other functions should not be enabled when doing an exponentiation. The exponentiation state machine uses the A, B, N, and E values.

Bit[7] Done—State Machine Finished

This bit reports the completion of a function operation. The value of this bit corresponds to the interrupt output pin value. Writing a zero to this bit clears the interrupt to the ARM processor.

Bit[8] Overflow—Overflow from Accumulator

The value of the overflow bit is stored in this bit of the control register. The bit can be cleared or set by the processor.

Bit[9] Softrst—Software Reset

Writing a one to this bit triggers a software reset of this block. The contents of the RAM's are not changed. This bit cannot be read as "1" since reset of the block and chip occurs before the next ARM CPU instruction can read any peripheral register bit.

Bit[10] Aone—Mask A value to One (1024 bit)

When this bit is set to a one, the value of A is masked to a 1024 bit value of '1'. This is useful in exponentiation for a starting value, and also to post multiply the Montgomery result to convert back to integer form.

Bit[11] Reserved

Bit[12] Mult—(Xword*Xword+Xword) Normal Multiplication

This bit can be used to do up to a 512×512+512 multiplication and add. The number of words (X) that is to be multiplied (max 16) is set in the Mult-ExpNum register. This function cannot be used in conjunction with the exponentiation function. This function performs a normal multiplication of the A and B values (non-destructive to A and B unless write back is used). The result is returned in the C result RAM. The current value of C (before multiplication) is added to the result of the Xword*Xword multiplication. The process completes in approximately (Xwords*Xwords+Xwords) clocks (e.g. 512×512 multiplication=16*16+16 clocks).

Bit[13] Czero—Zeroize C result

This function can be used to write all zeros to the C result RAM before using the Mult function. This bit can be set at the same time as the Mult bit and executes first.

Bit[15:14] Wbsel—Write Back Select Pointer

The Write Back Pointer select is used to select which pointer to use when writing back during the write back function. This value is ignored by the hardware when doing an exponentiation.

TABLE C

| WBSel Pointer Encoding | |
|---|---|
| WBSel | Pointer Selected |
| 00 | A Pointer |
| 01 | B Pointer |
| 10 | N Pointer |
| 11 | E Pointer |

The write back select cannot be used to select an initial A or initial B pointer location.

Bit[31:16] Reserved

Number of Bits in Exponent (Mult-ExpNum) Register (R/W) 620XX014h

Only the lower 10 bits (bits[9:0]) of this register are used. In this register a value of zero represents a 1024 bit exponent. All other values are equal to their real value. The number of bits that are in the exponent is written to the register prior to an exponentiation. This allows software to limit or prescan the exponent to increase performance of exponentiation time by not requiring the hardware to do squaring operations on the final exponents.

This register is also used to denote the number of words to be multiplied when using the WLT function.

Mult-Ptr Register (R/W) Reset=00103210h

TABLE D

| Mult-Ptr Register (R/W) 620XX018h | | | | | | | |
|---|---|---|---|---|---|---|---|
| 23 | 22 | 21 | 20 | 19 | 18 | 17 | 16 |
| iBptr[3] | iBptr[2] | ibptr[1] | iBptr[0] | iAptr[3] | iAptr[2] | iAptr[1] | iAptr[0] |
| 15 | 14 | 13 | 12 | 11 | 10 | 9 | 8 |
| Eptr[3] | Eptr[2] | Eptr[1] | Eptr[0] | Nptr[3] | Nptr[2] | Nptr[1] | Nptr[0] |
| 7 | 6 | 5 | 4 | 3 | 2 | 1 | 0 |
| Bptr[3] | Bptr[2] | Bptr[1] | Bptr[0] | Aptr[3] | Aptr[2] | Aptr[1] | Aptr[0] |

The pointer values are pointing to 32-word boundaries in the main memory (input RAM). The initial A locations are used for the first exponentiation operation (pre multiply the Montgomery values). Then the A and B locations are used to do all of the rest of the exponentiation operations. If the space is available to have different values in the initial iaptr pointer and the Aptr pointer, then the initial A value is preserved. The same holds true of the initial B value.

Bit[3:01] Aptr[3:0]—A Pointer

The location in the main memory where the A value is stored. The reset/default value of this pointer is 0000.

Bit[7:4] Bptr[3:0]—B Pointer

The location in the main memory where the B value is stored. The reset/default value of this pointer is 0001.

Bit[11:8] Nptr[3:0]—N Pointer

The location in the main memory where the N value is stored. The reset/default value of this pointer is 0010.

Bit[15:12] Eptr[3:0]—E Pointer

The location in the main memory where the E value is stored. The reset/default value of this pointer is 0011.

Bit[19:16] iAptr[3:0]—Initial A Pointer

The location in the main memory where the initial A value is stored. The reset/default value of this pointer is 0000.

Bit[23:20] iBptr[3:0]—Initial B Pointer

The location in the main memory where the initial B value is stored. The reset/default value of this pointer is 0001.

Bit[31:24] Reserved

Mult_C_Result RAM (R/W) 620XX100h-620XXI80h (COLD Power-On-Reset=UNDEFINED; WARM full-chip hardware or software Reset=NO CHANGE)

The intermediate result from the Montgomery multiplier is stored in the 33-word (I 32 bytes) Mult_C_Result RAM. This value can be copied back to the input RAM by using the write back function and the write back pointer. The contents of this RAM are not changed by hardware/software block level reset. Full-chip POST routines typically initialize this memory upon power-up. Since this RAM appears in the full-chip memory map, this area can be used as a general-purpose scratchpad RAM when the Multiplier/Expo block is not in use.

Mult-Operand RAM (R/W) 620XX800h-620XXBFCh (COLD Power-On-Reset=UNDEFINED; WARM full-chip hardware or software Reset=NO CHANGE)

The main 256-word (1024 bytes) RAM is used to store the operands for the Montgomery Multiply and Exponentiate functions. The operands can be stored at any location in the RAM on a 32 word boundary. The locations can then be defined by the use of the pointer register. The contents of this RAM are not changed by hardware/software block level reset. Full chip POST routines typically initialize this memory upon power-up. Since this RAM appears in the full chip memory map, this area can be used as a general-purpose scratchpad RAM when the Multiplier/Expo block is not in use.

Additional Multiplier/Expo System Architecture Details

The Mult/Expo can be used to implement a number of 1024 bit mathematical functions. The basic 32×32 multiply is available at all times when the multiplier state machine is not actively processing a function command.

Montgomery Multiply

The 32×32 multiplier core defines the value of r to be 31 and the value of small k to be 32. The Montgomery K value must be precomputed before doing the Montgomery J Loop. The Montgomery multiply algorithm calculates the value of—

A*B mod N A,B<N (N is odd)
2n

This requires that a value of $2^{2n}$ n mod N must be precomputed and multiplied by A using the Montgomery algorithm and multiplied by B using the Montgomery algorithm. Then the final result is computed by multiplying by one using the Montgomery algorithm to remove the extra 2n term in the number. The value of n is determined by the number of bits in the modulus N (n=log2(N)).

The exponentiator state machine does all of the premultiplying and post multiplying for the Montgomery conversions. The ARM must precompute the value $2^{2n}$ and the value of K for the exponentiator. Since both of these values only depend upon the modulus N, they only need to be computed when the modulus is changed.

Exponentiate

The following equation is considered when exponentiating:

$$Y = A^E \bmod N$$

The process of exponentiation destroys the value in the A location and the value in the B location. Additional pointers for initial A and initial B are provided as a non-destructive way to exponentiate. If the 128-word RAM configuration is not using the non-destructive capability, and A and B have to be reloaded after each exponentiation. In this configuration the pointer register must have initial A and initial B set to the same value as A and B pointer locations.

The exponentiation requires that the K value and the $2^{2n}$ mod N values are precomputed based on N. The software must then load the Initial A value (A in the above equation). Initial B must be loaded with the value of $2^{2n}$ mod N that has been precomputed. The K register must be loaded with the K value. The modulus (N) is loaded to the N location of the input RAM. The exponent (E) is loaded to the E location in the input RAM. The number of bits in the exponent must be set in the Mult_ExpNum register prior to exponentiation. The lower 8 bits of the Mult_CtiSts register must be loaded with the value of 40H to start exponentiation.

The done bit is set when the hardware completes the exponentiation function. The interrupt output pin is driven active until the done bit is written to a zero. The result (in integer form) is returned in the B location of the input RAM.

Exponentiation Performance Using An Example Embodiment

Example: Using the Mult/Expo to Support the Digital Signature Standard

The VMS320 chip can utilize the Digital Signature Standard (DSS) for Public Key Authentication. The DSS is also used in the key exchange algorithm to authenticate the user certificates. The following is an application example of DSS. In this example, the parameters are as follows:

p=A 512-bit to 1024-bit prime modulus. The size of p can be any multiple of 32 bits between these values.

q=A 160-bit prime divisor of p−1.

x=A terminal-unique secret integer chosen so that (O<x<q). The VMS320 IC can handle up to a 160-bit exponent for public key computations.

g=An element of order q in the multiplicative group of mod p. If h is a primitive root mod p then g can equal h(p−I)/q mod p.

$y=g^x$ mod p. This is the public key for the user holding the secret value x.

h=Hash of message to be signed.

With these values, we can enter the pre-computation phase that can occur prior to the actual need to sign a message.

After these values have been obtained, the signer can pre-compute the following values:

k=A secret integer, known only to the signer, generated for each message. The value k is chosen so that (O<k<q). This value can be generated in a pseudo-random fashion. The specific technique to be used is outside the scope of this standard.

$r=(g^k$ mod p) mod q.

Depending on the way a signature scheme is implemented, these computations may not impact signature timeliness. We can now enter the signing phase of the digital signature.

Once a message to be signed becomes available, the steps in computing the actual signature values are as follows. Compute:

s=k−I (h+(x)(r)) mod q. This results in a 160-bit integer.

The values r and s constitute the signature of the message. The message, r, and s are sent to the recipient where the signature can be verified.

To verify a signed message, a recipient must have the following global information:

p=The modulus being used by the signer.

y=The public key for the user who signed the received message.

To verify the signature the recipient then computes the following:

u1=(h)(s)−I mod q u2=(r)(s)−I mod q v=(g)u1(y)u2 mod p=((gh)(yr))s−1 mod p=(gh+xr)k(h+xr)−1 mod p=$g^k$ mod p The recipient then checks to see that v mod q is the same as r. If they are equal, the signature is verified.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

What is claimed is:

1. A configurable high-speed modular exponentiator and multiplier circuit arrangement, comprising:

a bus interface;

a memory coupled to the bus interface, the memory configured to store operands corresponding to modulo representations of multiplicands;

a modulus multiplier coupled to the memory, the modulus multiplier configured and arranged to generate a product of multiplicands read from the memory;

a control register coupled to the bus interface, the control register configured and arranged to store control codes received via the bus interface;

a first state machine coupled to the modulus multiplier and to the control register, the first state machine configured and arranged to control a first set of mathematical operations used by the modulus multiplier to perform a modulus multiplication operation responsive to a first control code in the control register; and a second state machine coupled to the modulus multiplier and to the control register, the second state machine configured and arranged to control a second set of mathematical operations for calculating the exponentiation responsive to a second control code in the control register.

2. A circuit arrangement according to claim 1, wherein the first set and the second set of mathematical operations are performed according to a Montgomery multiplication algorithm.

3. The circuit arrangement of claim 2, further comprising a constant register coupled to the bus interface and to the modulus multiplier, the constant register configured and arranged for storage of a constant value, K, for the Montgomery algorithm.

4. A circuit arrangement according to claim 1, wherein the modulus multiplier comprises a 64 bit-by-64 bit multiplier.

5. A circuit arrangement according to claim 1, further comprising a working memory coupled to the modulus multiplier, the working memory configured and arranged to store at least one result of the first set and second set of mathematical operations.

6. A circuit arrangement according to claim 4, wherein the working memory is further configured and arranged to store the result of the exponentiation.

7. A circuit arrangement according to claim 4, wherein the working memory comprises a 32 bit wide memory.

8. The circuit arrangement of claim 1, wherein the first state machine is further configured and arranged to control a number of words multiplied by the modulus multiplier responsive to a third control code from the control register when the first control code is present in the control register.

9. The circuit arrangement of claim 8, wherein the second state machine is further configured and arranged to control calculating the exponentiation responsive to a fourth control code from the control register when the second control code is present in the control register, wherein the fourth control code specifies a number of bits comprising an exponent.

10. The circuit arrangement of claim 1, wherein the second state machine is further configured and arranged to control calculating the exponentiation responsive to a fourth control code from the control register when the second control code is present in the control register, wherein the fourth control code specifies a number of bits comprising an exponent.

11. A configurable apparatus for performing high-speed exponentiation and multiplication operations, comprising:
   a bus interface;
   a memory coupled to the bus interface configured to store operands and intermediate mathematical operation results;
   a multiplier core coupled to the memory, the multiplier core configured and arranged to perform a modulus multiplication operation;
   a control register coupled to the bus interface, the control register configured and arranged to store control codes received via the bus interface;
   a first hardware state machine coupled to the multiplier core and to the control register, the first hardware state machine configured and arranged to control a first set of mathematical operations used by the multiplier core in generating the intermediate mathematical operation results responsive to a first control code in the control register; and
   a second hardware state machine coupled to the multiplier core and to the control register, the second hardware state machine configured and arranged to control a second set of mathematical operations used to perform the exponentiation operation responsive to a second control code in the control register.

12. An apparatus according to claim 7, wherein the first set and second set of mathematical operations are performed according to a Montgomery multiplication algorithm.

13. An apparatus according to claim 7, wherein the multiplier core comprises a 32 bit-by-32 bit unsigned multiplier.

14. An apparatus according to claim 9, further comprising at least one register coupled to the memory and to the multiplier, wherein the multiplier is configured and arranged to receive the operands from the memory via the at least one register.

15. An apparatus according to claim 7, wherein the multiplier core comprises a 33 bit adder.

16. An apparatus according to claim 11, wherein the multiplier core comprises a 3-by-64 bit adder coupled to the 33 bit adder.

17. An apparatus according to claim 7, further comprising at least one operand memory coupled to the memory and to the multiplier, wherein the multiplier is configured and arranged to receive the operands from the memory via the at least one operand memory.

18. An apparatus according to claim 13, wherein the operand memory is integral with the multiplier core.

19. An apparatus according to claim 13, wherein the operand memory is distinct from the multiplier core.

20. An apparatus according to claim 13, wherein the operand memory stores initial values of the operands.

21. An apparatus according to claim 13, further comprising a pointer register for generating addresses for accessing the operand memory.

22. A configurable apparatus for performing high-speed multiplication and exponentiation operations, comprising:
   a bus interface;
   a multiplier core configured and arranged to receive operands and perform a modulus multiplication operation;
   a memory coupled to the multiplier core and to the bus interface, the memory configured and arranged to independently store the operands and intermediate mathematical operation results of the modulus multiplication operation;
   a control register coupled to the bus interface, the control register configured and arranged to store control codes received via the bus interface; and
   a software-controllable, hardware state machine coupled to the multiplier core and to the control register, the state machine configured and arranged to control the multiplier core to selectively perform multiplication and exponentiation using a Montgomery multiplication operation responsive to different control codes in the control register.

23. A configurable encryption apparatus comprising:
   a bus interface;
   a multiplier core configured and arranged to receive operands and perform a modulus multiplication operation;
   a memory coupled to the multiplier core and to the bus interface, the memory configured and arranged to independently store the operands and intermediate mathematical operation results of the modulus multiplication operation;
   a control register coupled to the bus interface, the control register configured and arranged to store control codes received via the bus interface; and
   a software-controllable, hardware state machine coupled to the multiplier core and to the control register, the state machine configured and arranged to control the multiplier core to selectively perform multiplication and exponentiation using a Montgomery multiplication operation responsive to different control codes in the control register.

24. A method for performing high-speed multiplication and exponentiation operations, comprising:
   configuring a control register with a control code for a selected operation;
   performing a modulus multiplication operation on received operands if the control code specifies multiplication;
   performing an exponentiation operation if the control code specifies exponentiation;
   storing the operands and intermediate mathematical operation results of the modulus multiplication and exponentiation operation in a memory; and
   performing the multiplication and exponentiation using a software-controllable, hardware state machine to control performance of the modulus multiplication and exponentiation operations according to a Montgomery multiplication algorithm.

25. A configurable apparatus for performing high-speed multiplication and exponentiation operations, comprising:
   means for configuring a control register with a control code for a selected operation;
   means for performing a modulus multiplication operation on received operands if the control code specifies multiplication;
   means for performing an exponentiation operation if the control code specifies exponentiation;
   means for storing the operands and intermediate mathematical operation results of the modulus multiplication and exponentiation operations in a memory; and
   means for performing the multiplication and exponentiation using a software-controllable, hardware state machine to control performance of the modulus multiplication and exponentiation operations according to a Montgomery multiplication algorithm.

* * * * *